(12) United States Patent
Peterson et al.

(10) Patent No.: US 12,167,814 B2
(45) Date of Patent: Dec. 17, 2024

(54) GRILL WITH ADJUSTABLE VENTING

(71) Applicant: Lodge Manufacturing Company, South Pittsburg, TN (US)

(72) Inventors: Kelly Peterson, Chattanooga, TN (US); Christopher Dorion, Elmhurst, IL (US)

(73) Assignee: LODGE MANUFACTURING COMPANY, South Pittsburg, TN (US)

( * ) Notice: Subject to any disclaimer, the term of this patent is extended or adjusted under 35 U.S.C. 154(b) by 396 days.

(21) Appl. No.: 17/586,693

(22) Filed: Jan. 27, 2022

(65) Prior Publication Data

US 2023/0233025 A1     Jul. 27, 2023

(51) Int. Cl.
| | | |
|---|---|---|
| *A47J 37/07* | (2006.01) | |
| *F24B 3/00* | (2006.01) | |
| *F24B 5/06* | (2006.01) | |

(52) U.S. Cl.
CPC ....... *A47J 37/0786* (2013.01); *A47J 37/0704* (2013.01); *A47J 37/0763* (2013.01); *F24B 3/00* (2013.01); *F24B 5/06* (2013.01)

(58) Field of Classification Search
CPC ................ A47J 37/0786; A47J 37/0704; A47J 37/0763; F24B 3/00; F24B 5/06
USPC ....................................................... 126/25 R
See application file for complete search history.

(56) References Cited

U.S. PATENT DOCUMENTS

| | | | | |
|---|---|---|---|---|
| 843,773 | A | * 2/1907 | Stanford | ............... F24B 5/06 |
| | | | | 126/289 |
| 1,181,597 | A | * 5/1916 | James | .................. F24B 5/06 |
| | | | | 126/1 AE |
| D125,446 | S | 2/1941 | Jones, Jr. et al. | |
| D125,447 | S | 2/1941 | Jones, Jr. et al. | |
| | | (Continued) | | |

FOREIGN PATENT DOCUMENTS

| | | | |
|---|---|---|---|
| DE | 9319971 U1 | 6/1994 | |
| DE | 10151402 A1 | * 6/2006 | .......... A47J 37/0704 |
| | (Continued) | | |

OTHER PUBLICATIONS

"Cajun Classic Round Seasoned Cast Iron Charcoal Hibachi Grill," BBQ Guys, Available Online at https://www.bbqguys.com/cajun-cookware/round-seasoned-cast-iron-charcoal-hibachi-grill-gl10447#:~:text=Specifications%20%20%20Fuel%20Type%20%20%20Charcoal,%20%20No%20%2010%20more%20rows%20, Available as Early as Apr. 10, 2017, 5 pages.

(Continued)

*Primary Examiner* — Avinash A Savani
(74) *Attorney, Agent, or Firm* — Alleman Hall & Tuttle LLP

(57) ABSTRACT

Examples are disclosed that relate to grills and methods of adjusting airflow through a fuel bowl of a grill. In one example, a grill includes a cooking grate and a fuel bowl configured to removably support the cooking grate. The fuel bowl includes an ash grate at a bottom surface. A base supports the bottom surface of the fuel bowl. The base (Continued)

comprises a first base side wall that defines a first base venting aperture, and a second base side wall opposite to the first base side wall that defines a second base venting aperture. A venting drawer is slidably received within the base, with the venting drawer comprising a first drawer side wall that defines a first drawer venting aperture, and a second drawer side wall opposite to the first drawer side wall and defining a second drawer venting aperture.

17 Claims, 7 Drawing Sheets

(56) References Cited

U.S. PATENT DOCUMENTS

| | | | | |
|---|---|---|---|---|
| 3,169,517 | A | * | 2/1965 | Maier .................. F24C 15/102 126/52 |
| 3,915,144 | A | * | 10/1975 | Tomita ...................... F24B 3/00 126/25 B |
| 5,065,889 | A | | 11/1991 | Conti |
| 5,588,420 | A | * | 12/1996 | Dickson .............. A47J 37/0704 126/25 R |
| 6,293,271 | B1 | | 9/2001 | Barbour |
| 7,984,709 | B1 | * | 7/2011 | Byrnes ................ A47J 37/0704 126/250 |
| D778,104 | S | | 2/2017 | Conlee et al. |
| 10,070,754 | B2 | | 9/2018 | Schlosser et al. |
| D871,129 | S | | 12/2019 | Peterson |
| D871,139 | S | | 12/2019 | Peterson |
| 2010/0206291 | A1 | | 8/2010 | Axinte et al. |
| 2011/0283990 | A1 | * | 11/2011 | Walters ............... A47J 37/0704 126/25 B |
| 2014/0208961 | A1 | | 7/2014 | Poon |
| 2016/0227965 | A1 | | 8/2016 | Johnston et al. |
| 2017/0105573 | A1 | * | 4/2017 | Atkisson ............. A47J 37/0786 |
| 2018/0125292 | A1 | | 5/2018 | Workman et al. |
| 2022/0160173 | A1 | | 5/2022 | Peterson |

FOREIGN PATENT DOCUMENTS

| | | |
|---|---|---|
| EP | 0555176 A1 | 8/1993 |
| KR | 100606462 B1 | 8/2006 |

OTHER PUBLICATIONS

"Lodge Sportsman's Portable Cast Iron Charcoal Grill in Black," The Home Depot, Available Online at https://www.homedepot.com/p/Lodge-Sportsman-s-Portable-Cast-Iron-Charcoal-Grill-in-Black-L410/301053901?cm_sp=BazVoice-L-SYN-_-301053901-_-x#product-overview, Available as Early as Jan. 13, 2019, 7 pages.

"Kickoff Grill™," Lodge Cast Iron, Available Online at https://www.lodgecastiron.com/product/seasoned-cast-iron-kickoff-grill?sku=L12RG, Available as Early as Jan. 24, 2022, 5 pages.

"Lodge L410—Pre-Seasoned Sportsman's Charcoal Hibachi Grill," Hibachi Grill Store, Available Online at https://www.hibachigrillstore.com/lodge-1410-pre-seasoned-sportsmans-charcoal-hibachi-grill/, Available as Early as Jul. 30, 2018, 26 pages.

"Old Smokey Charcoal Grills," Old Smokey, Available Online at https://www.oldsmokey.com/pages/old-smokey-charcoal-grills, Available as Early as May 12, 2014, 3 pages.

"#14 Old Smokey Charcoal Grill," Available Online at https://www.oldsmokey.com/collections/grills/products/14-old-smokey-charcoal-grill, Available as Early as Aug. 6, 2014, 6 pages.

* cited by examiner

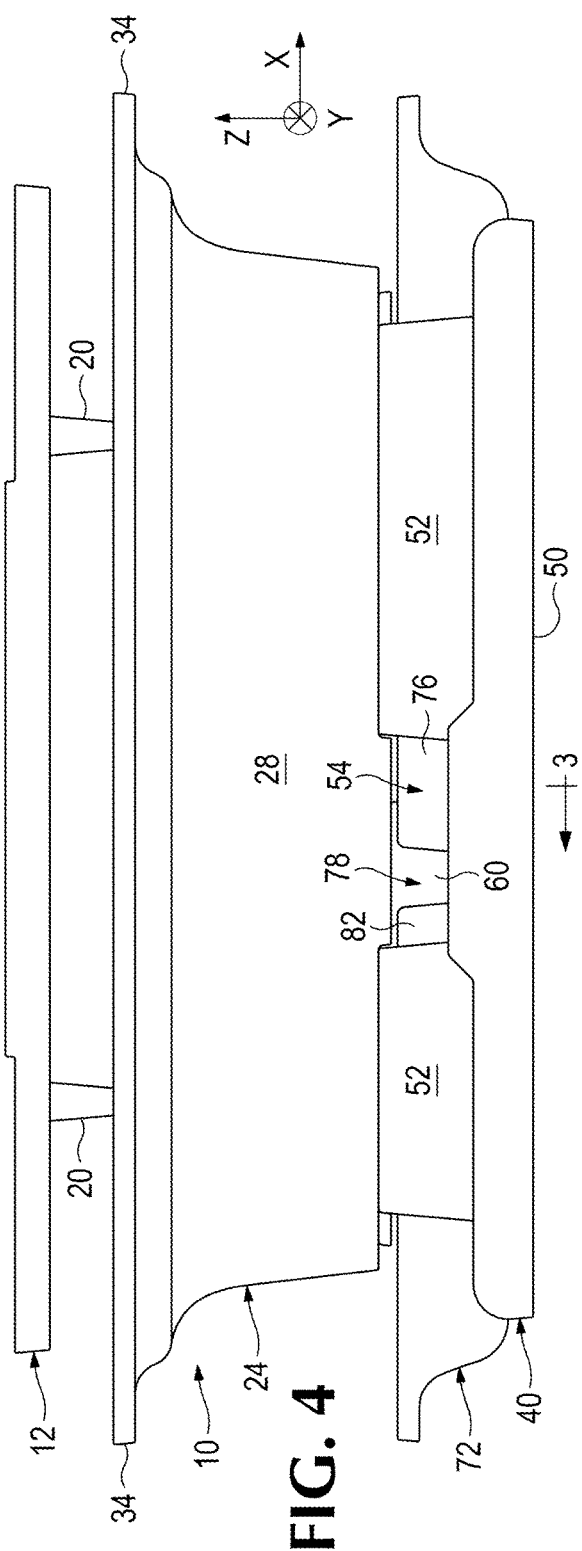
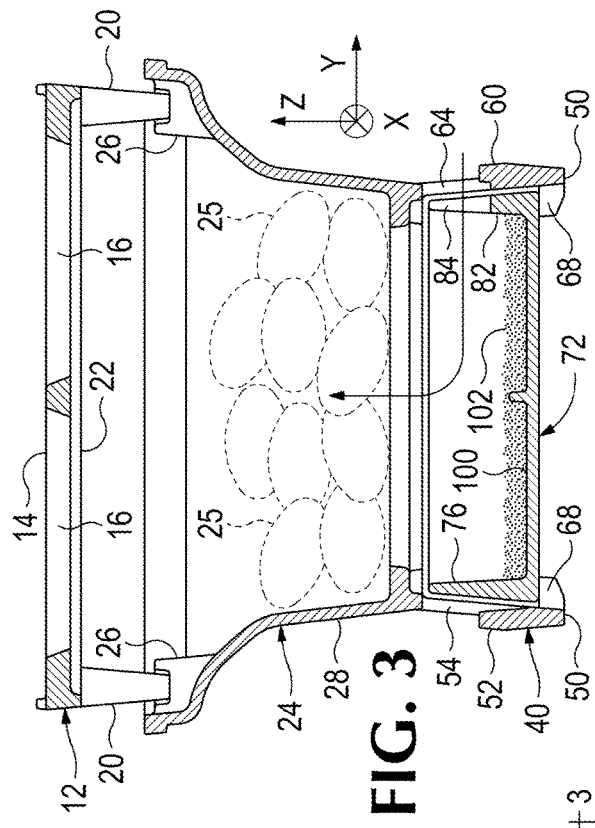
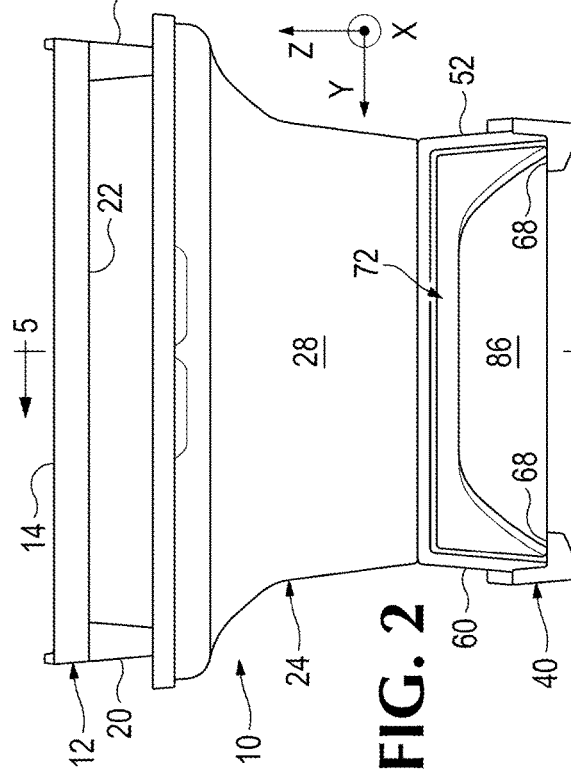

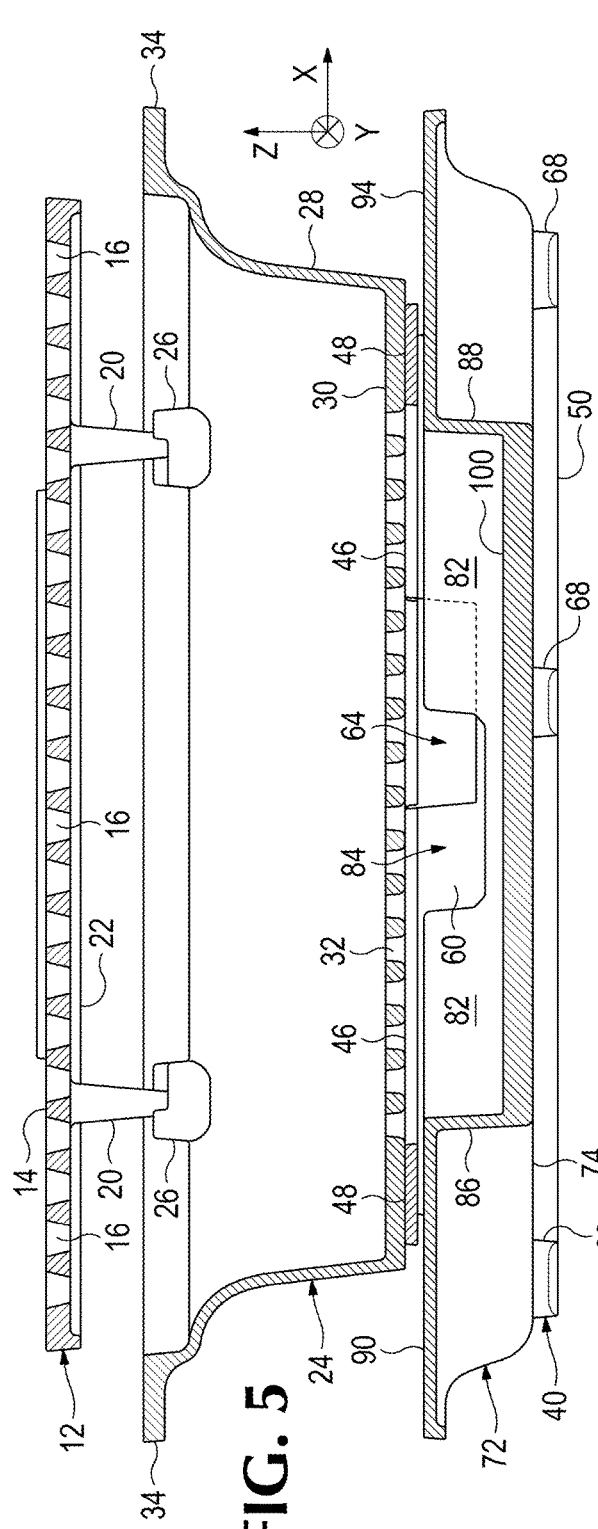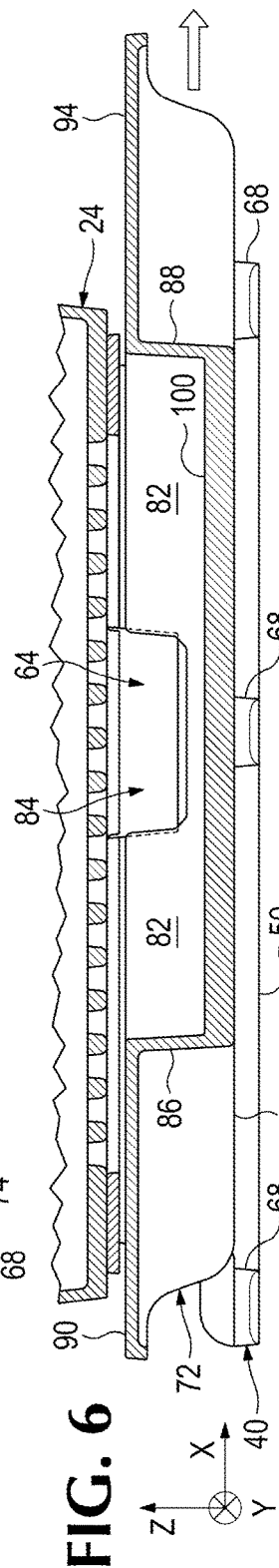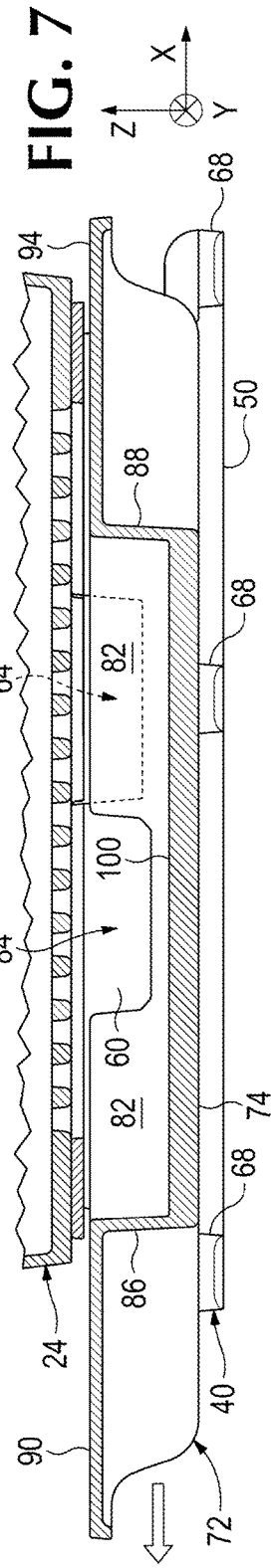

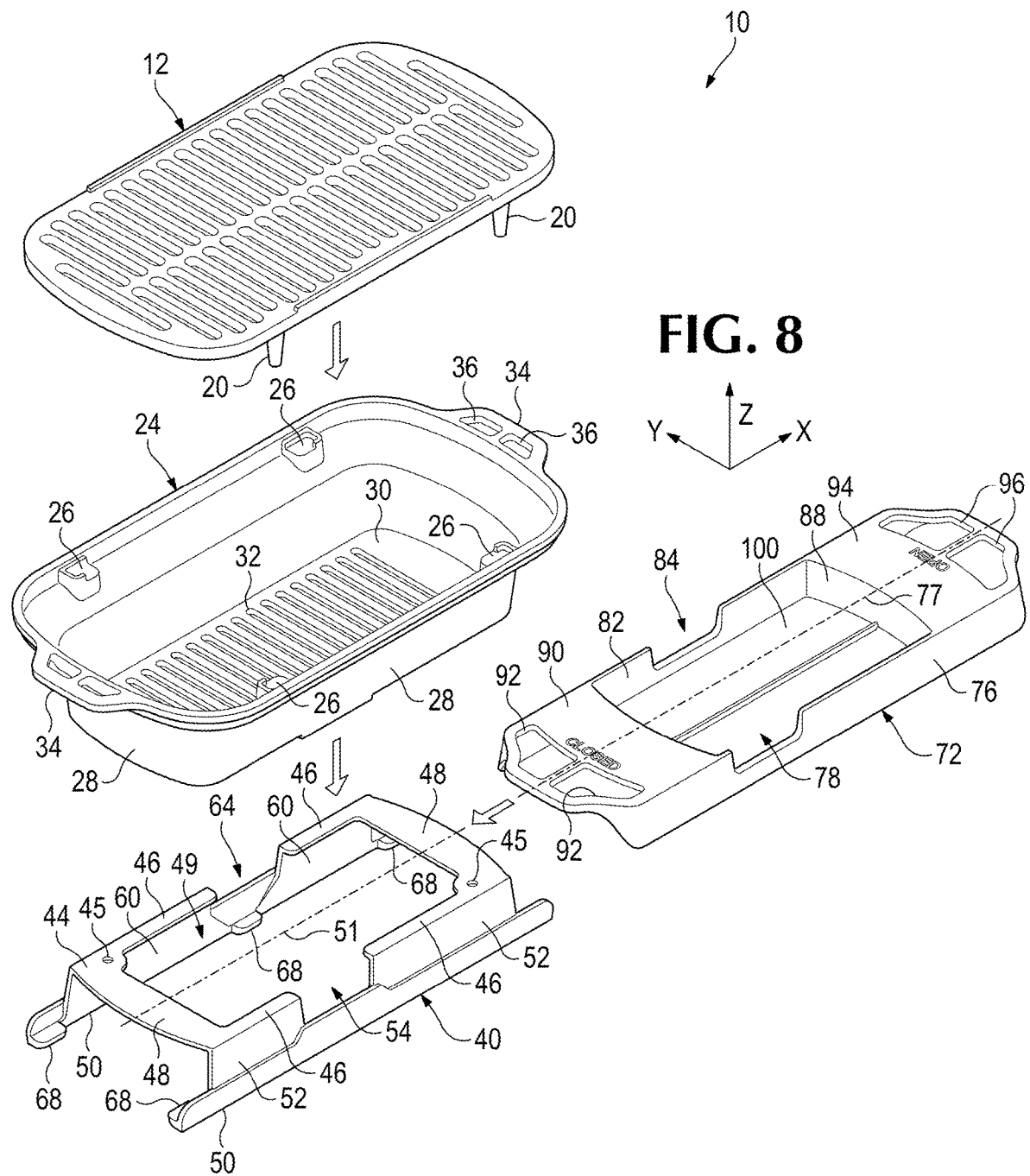

Sliding the venting drawer within the base to an open position in which the first drawer venting aperture aligns with a first base venting aperture of the base and the second drawer venting aperture of the venting drawer aligns with a second base venting aperture of the base ~204

Sliding the venting drawer within the base to a partial draft position in which the first base venting aperture is partially blocked by the first drawer side wall and the second base venting aperture is partially blocked by the second drawer side wall ~208

Sliding the venting drawer within the base to a closed position in which the first base venting aperture is blocked by the first drawer side wall and the second base venting aperture is blocked by the second drawer side wall ~212

FIG. 13

GRILL WITH ADJUSTABLE VENTING

BACKGROUND

Portable grills can be useful for many activities, including picnicking, camping, and tailgating. Some grills have a smaller form factor that is convenient for traveling and enhances their portability. However, some of these grills utilize multiple separate components, such as handles, legs, grates, vent doors, fasteners, and grilling surfaces, which may take time to assemble before use. Further, some of these components can fall out and become lost during use, cleaning, and/or travel. Additionally and in some examples, it can be challenging to control airflow to a fuel source in these grills, and to clean the grill after use.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to grills and methods of controlling airflow through a grill. In one example, a grill comprises a cooking grate and a fuel bowl that removably supports the cooking grate. The fuel bowl includes an ash grate at a bottom surface. A base supports the bottom surface of the fuel bowl. The base comprises a first base side wall that defines a first base venting aperture, and a second base side wall opposite to the first base side wall that defines a second base venting aperture.

A venting drawer is slidably received within the base. The venting drawer comprises a first drawer side wall that defines a first drawer venting aperture, and a second drawer side wall opposite to the first drawer side wall and defining a second drawer venting aperture.

In another example a grill comprises a cooking grate and a fuel bowl that removably supports the cooking grate. The fuel bowl includes an ash grate at a bottom surface, and a base supports the bottom surface of the fuel bowl. The base comprises a first base side wall that defines a first base venting aperture, and a second base side wall opposite to the first base side wall that defines a second base venting aperture.

A venting drawer is slidably received within the base. The venting drawer comprises a first drawer side wall that defines a first drawer venting aperture, and a second drawer side wall opposite to the first drawer side wall and defining a second drawer venting aperture. When the venting drawer is moved to an open position relative to the base, the first drawer venting aperture is aligned with the first base venting aperture and the second drawer venting aperture is aligned with the second base venting aperture. When the venting drawer is moved to a partial draft position relative to the base that is between the open position and a closed position relative to the base, the first base venting aperture is partially blocked by the first drawer side wall and the second base venting aperture is partially blocked by the second drawer side wall.

Another example provides a method for adjusting airflow through a fuel bowl of a grill. The grill comprises a venting drawer slidably received within a base that supports the fuel bowl, with the venting drawer comprising a first drawer side wall that defines a first drawer venting aperture and a second drawer side wall opposite to the first drawer side wall that defines a second drawer venting aperture. The method comprises sliding the venting drawer within the base to an open position in which the first drawer venting aperture aligns with a first base venting aperture of the base and the second drawer venting aperture of the venting drawer aligns with a second base venting aperture of the base. The method further comprises sliding the venting drawer within the base to a partial draft position in which the first base venting aperture is partially blocked by the first drawer side wall and the second base venting aperture is partially blocked by the second drawer side wall.

BRIEF DESCRIPTION OF THE DRAWINGS

FIG. 2 shows an end view of the grill of FIG. 1.

FIG. 3 shows a cross section of the grill of FIG. 1 taken along line 3-3 of FIG. 4.

FIG. 4 shows a side view of the grill of FIG. 1.

FIG. 5 shows a cross section of the grill of FIG. 1 taken along line 5-5 of FIG. 2.

FIG. 6 shows the cross section view of FIG. 5 with the venting drawer moved to an open position relative to the base.

FIG. 7 shows the cross section view of FIG. 5 with the venting drawer moved to a closed position relative to the base.

FIG. 8 shows an exploded view of the grill of FIG. 1 according to examples of the present disclosure.

FIG. 13 shows a flow diagram of an example method for adjusting airflow through a fuel bowl of a grill.

DETAILED DESCRIPTION

As noted above, portable grills can be useful for many activities, including picnicking, camping, and tailgating. Some grills have a small form factor that is convenient for traveling. However, some such portable grills have loose or removeable components, such as vent doors, handles, legs, grates, fasteners, and/or grilling surfaces, which may take time to assemble before use. Further, some of these components can fall out or become lost during use, cleaning, and/or travel.

In some examples, it can also be challenging to control airflow to a fuel source inside the grill, such as charcoal. Additionally and with many grill designs, cleaning the grill and disposing of ash after use is an inconvenient, awkward, and messy task.

Accordingly, examples are disclosed that relate to grills and methods of adjusting airflow through a fuel bowl of a grill. Briefly, a grill comprises a cooking grate and a fuel bowl that removably supports the cooking grate and includes an ash grate at a bottom surface. As described in more detail below, a base supports the bottom surface and comprises a first base side wall that defines a first base venting aperture and a second base side wall opposite to the first base side wall that defines a second base venting aperture.

A venting drawer is slidably received within the base. The venting drawer includes a first drawer side wall that defines a first drawer venting aperture, and a second drawer side wall opposite to the first drawer side wall and defining a second drawer venting aperture. Advantageously and as described in more detail below, the drawer venting apertures and the base venting apertures are configured to enable a user to easily and conveniently adjust the airflow through the fuel bowl by simply sliding the venting drawer relative to the base. Additionally, the venting drawer functions as a container that collects ash produced by the burning charcoal. Accordingly, a user can easily and neatly dispose of the ash by simply sliding the venting drawer out from the base and depositing the ash in a suitable receptacle. Furthermore, the entire grill is composed of just four separate components and avoids using any small or detachable components that could be easily lost or misplaced.

Figure 1:
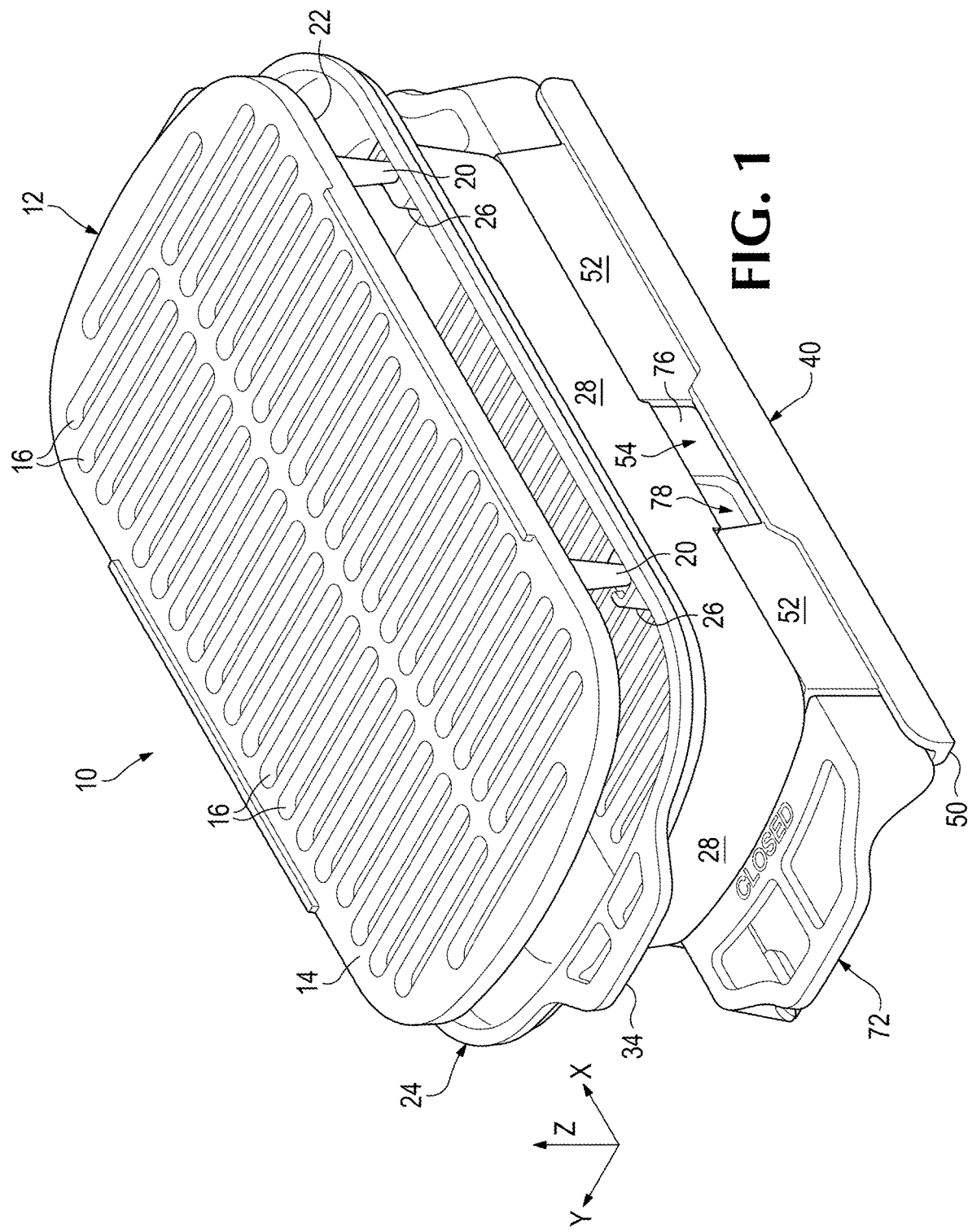
FIG. 1 shows an example of a grill including a venting drawer in a partial draft position according to examples of the present disclosure.

FIG. 1 shows one example of a grill 10 according to the present disclosure. With reference also to FIG. 8 and as noted above, the grill comprises four components—a cooking grate 12, fuel bowl 24, a base 40, and a venting drawer 72 slidably received within the base. As described in more detail below, the fuel bowl 24 is removably supported by the base 40, and the cooking grate 12 is removably supported above the fuel bowl. In some examples, each of the cooking grate 12, fuel bowl 24, base 40, and venting drawer 72 is fabricated from cast-iron. These four components are quickly and easily assembled, and the four-piece design of the grill 10 is conveniently portable.

The cooking grate 12 includes an upper grilling surface 14 that defines a plurality of grilling apertures 16, and an opposing lower surface 22. In operation, a variety of meats, vegetables, and other foods can be grilled on the cooking grate 12. With reference also to FIGS. 5 and 8, the cooking grate incudes a plurality of downward-extending legs 20 that are configured to be removably seated in corresponding leg receptacles 26 that extend inwardly in the fuel bowl 24. In this example, the cooking grate 12 includes two legs 20 on one side of the cooking grate and two legs 20 on the opposing side of the cooking grate. Similarly, the fuel bowl 24 includes two corresponding leg receptacles 26 extending inwardly from one bowl wall 28 and two corresponding leg receptacles 26 extending inwardly from the opposing bowl wall 28. Advantageously and with reference also to FIG. 3, with this configuration the cooking grate 12 can be easily removably supported above the fuel source, such as charcoal briquettes 25, in the fuel bowl 24.

With reference again to FIG. 8, the fuel bowl 24 includes a bottom surface 30 that defines an ash grate 32 on which a fuel source, such as charcoal briquettes, can be placed and heated. In this example, the fuel bowl 24 also includes handles 34 on opposing ends of the fuel bowl. Each of the handles defines side-by-side handle openings that are configured to receive, for example, hooks from a separate carry handle that enables the fuel bowl to be lifted and carried safely.

The bottom surface 30 of the fuel bowl 24 is configured to rest on and be supported by support surfaces 44 of the base 40. More particularly and as shown in FIGS. 5 and 8, the base 40 includes side support surfaces 46 and end support surfaces 48 that support the bottom surface 30 of the fuel bowl 24. In some examples, the fuel bowl 24 is attached to the base 40, such as via one or more fasteners. In the present example and with reference to FIG. 8, the base 40 defines two bolt holes 45 that are each configured to receive a bolt (not shown) that extends through the bottom surface 30 of the fuel bowl 24 to thereby affix the fuel bowl to the base. The side support surfaces 46 and end support surfaces 48 also define a top base aperture 49 that enables airflow from outside the base to pass upwardly through the ash grate 32 of the fuel bowl 24 during cooking.

Figure 9:
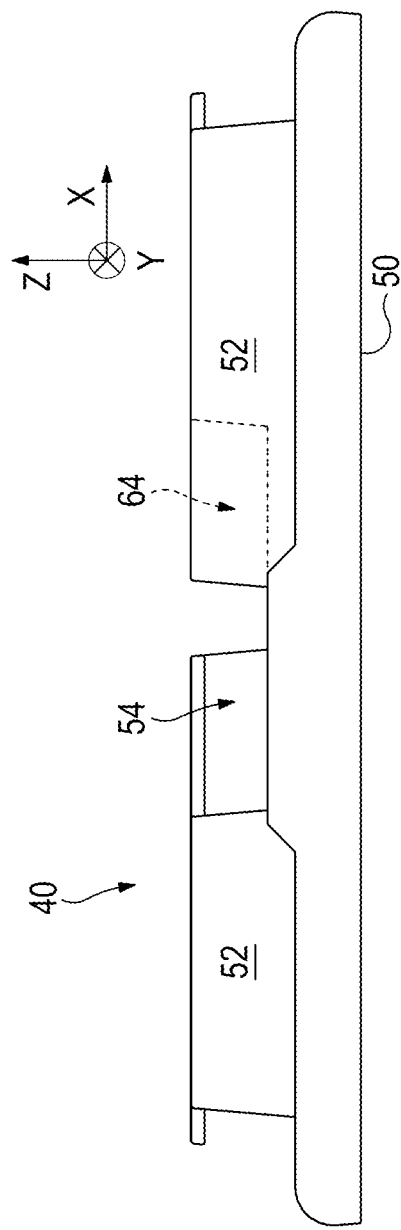
FIG. 9 shows a side view of the base of the grill of FIG. 1.

With reference also to FIG. 9, the base 40 includes a first base side wall 52 that defines a first base venting aperture 54 and a second base side wall 60 opposite to the first base side wall and defining a second base venting aperture 64. As described further below, and in one potential advantage of the present disclosure, the first base venting aperture 54 and second base venting aperture 64 cooperate with venting apertures in the slidable venting drawer 72 to enable easily and finely controlled adjustments of airflow through the fuel bowl 24.

The base is configured to sit on a supporting surface, such as a gravel or dirt surface, on elongated feet 50 that extend below each of the first base side wall 52 and second base side wall 60. In some examples, the base 40 has a length along its base longitudinal axis 51 of approximately 40.1 cm. from one end of an elongated foot 50 to the opposite end of the foot. In other examples, the base 40 can have any suitable length.

The venting drawer 72 is slidably received within the base 40. In this example, and with reference to FIGS. 3 and 5-8, portions of a bottom surface 74 of the venting drawer 72 are configured to rest on drawer support tabs 68 that extend inwardly from the first base sidewall 52 and second base sidewall 60, thereby enabling sliding movement of the venting drawer 72 with respect to the base 40. As described in more detail below, and in one potential advantage of the present disclosure, in this example the base 40 includes 6 drawer support tabs 68 that are located and configured in a manner such that all 6 drawer support tabs support the venting drawer 72 when the venting drawer is in a partial draft position relative to the base 40 (see FIGS. 1, 4, and 5). Additionally, the 6 drawer support tabs 68 are also located and configured in a manner such that 4 of the drawer support tabs 68 support the venting drawer 72 when the venting drawer is in either a closed position (see FIG. 7) or in an open position (see FIG. 6) relative to the base.

Figure 10:
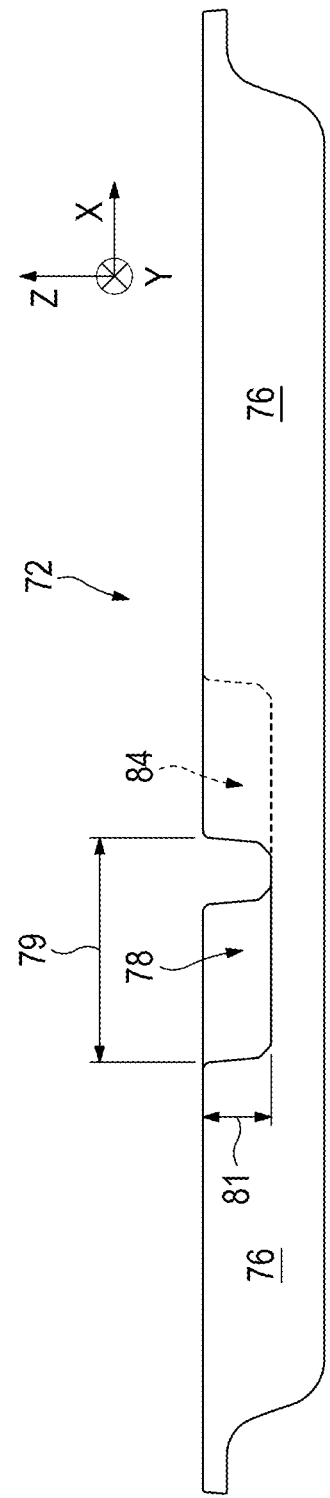
FIG. 10 shows a side view of the venting drawer of the grill of FIG. 1.

With continued reference to FIG. 8, the venting drawer 72 includes a first drawer side wall 76 that defines a first drawer venting aperture 78 and a second drawer side wall 82 opposite to the first drawer side wall that defines a second drawer venting aperture 84. With reference to FIG. 10 and in some examples, the first drawer venting aperture 78 and the second drawer venting aperture 84 each have a width 79 of approximately 7.5 cm., and the first drawer venting aperture 78 and the second drawer venting aperture 84 each have height of approximately 2.3 cm.

As shown in FIGS. 8 and 10, and in one potential advantage of the present disclosure, the first drawer venting aperture 78 is offset from the second drawer venting aperture 84 along the drawer longitudinal axis 77 of the venting drawer 72. As described in more detail below, this configuration promotes airflow across a greater surface area of the ash grate 32 and charcoal briquettes 25 (or other fuel source) above the venting drawer 72, to thereby provide more uniform heating of the briquettes and more consistent distribution of heat within the fuel bowl 24.

In a similar manner, and with reference to FIGS. 8 and 9, in the base 40 the first base venting aperture 54 is offset from the second base venting aperture 64 along the longitudinal axis 51 of the base. As with the offset of the first drawer venting aperture from the second drawer venting aperture 84, this configuration of the first and second base venting apertures 54, 64 promotes airflow across a greater surface area of the ash grate 32 and charcoal briquettes 25 above the venting drawer 72.

As noted above, and in another potential advantage of the present disclosure, a user can easily and conveniently adjust the airflow through the fuel bowl 24 by simply sliding the venting drawer 72 relative to the base 40 in a longitudinal direction parallel to the longitudinal axis 51 of the base. With reference to FIGS. 1-5, these figures depict the venting drawer 72 in a partial draft position relative to the base 40 in which the first base venting aperture 54 is partially blocked by the first drawer side wall 76 and the second base venting aperture 64 is partially blocked by the second drawer side wall 82, to thereby partially restrict airflow into the base 40 and fuel bowl 24.

It will be appreciated that for purposes of the present disclosure, a partial draft position includes any position of the venting drawer 72 in which the first base venting aperture 54 is partially blocked by the first drawer side wall 76 and the second base venting aperture 64 is partially blocked by the second drawer side wall 82. Alternatively expressed, a partial draft position includes any position of the venting drawer 72 between the open venting position of the venting drawer (described further below and shown in FIG. 6) and a closed position of the venting drawer (also described further below and shown in FIG. 7).

Figure 11:
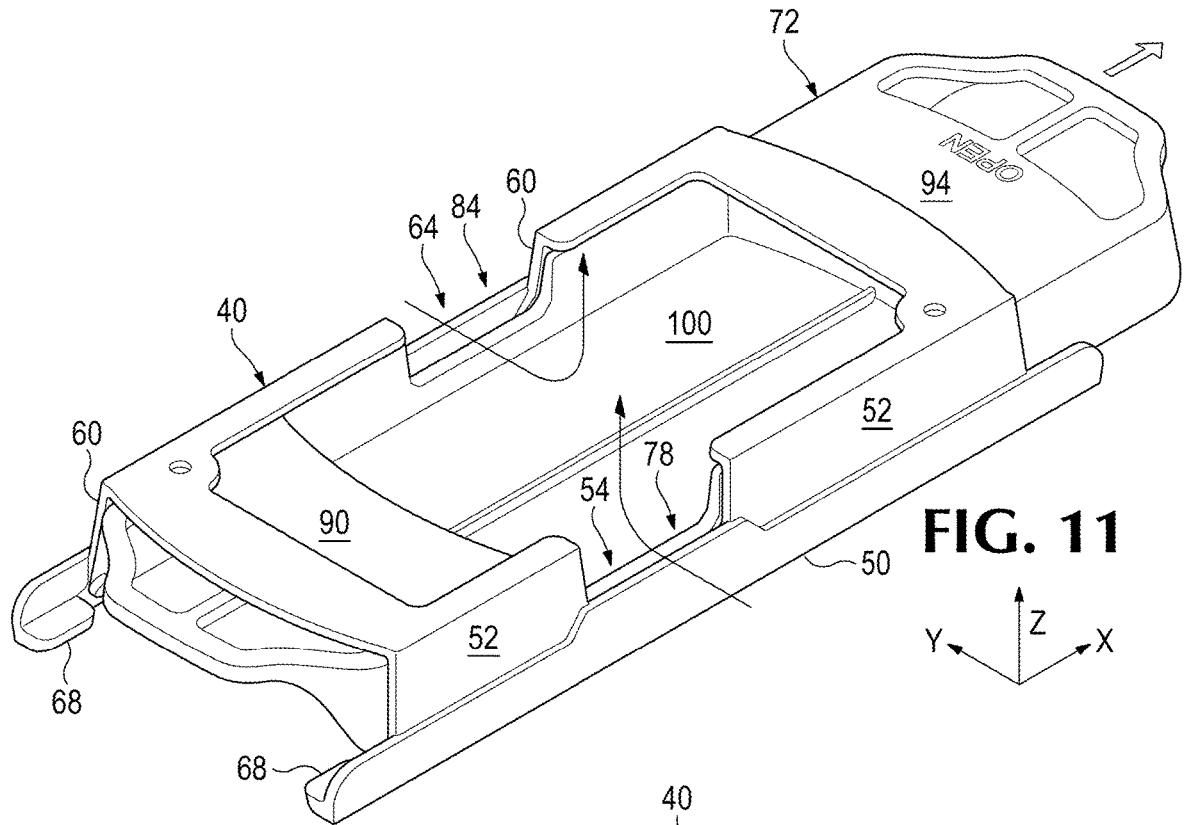
FIG. 11 shows the venting drawer in the open position relative to the base.

In FIGS. 6 and 11 the venting drawer 72 has been moved in the positive x-axis direction relative to the base 40 to an open position relative to the base 40 in which the first drawer venting aperture 78 aligns with the first base venting aperture 54 and the second drawer venting aperture 84 aligns with the second base venting aperture 64. In this position, a greater volume of airflow is provided into the base 40 and fuel bowl 24 to allow for increased heating of the charcoal briquettes 25 in the fuel bowl.

Figure 12:
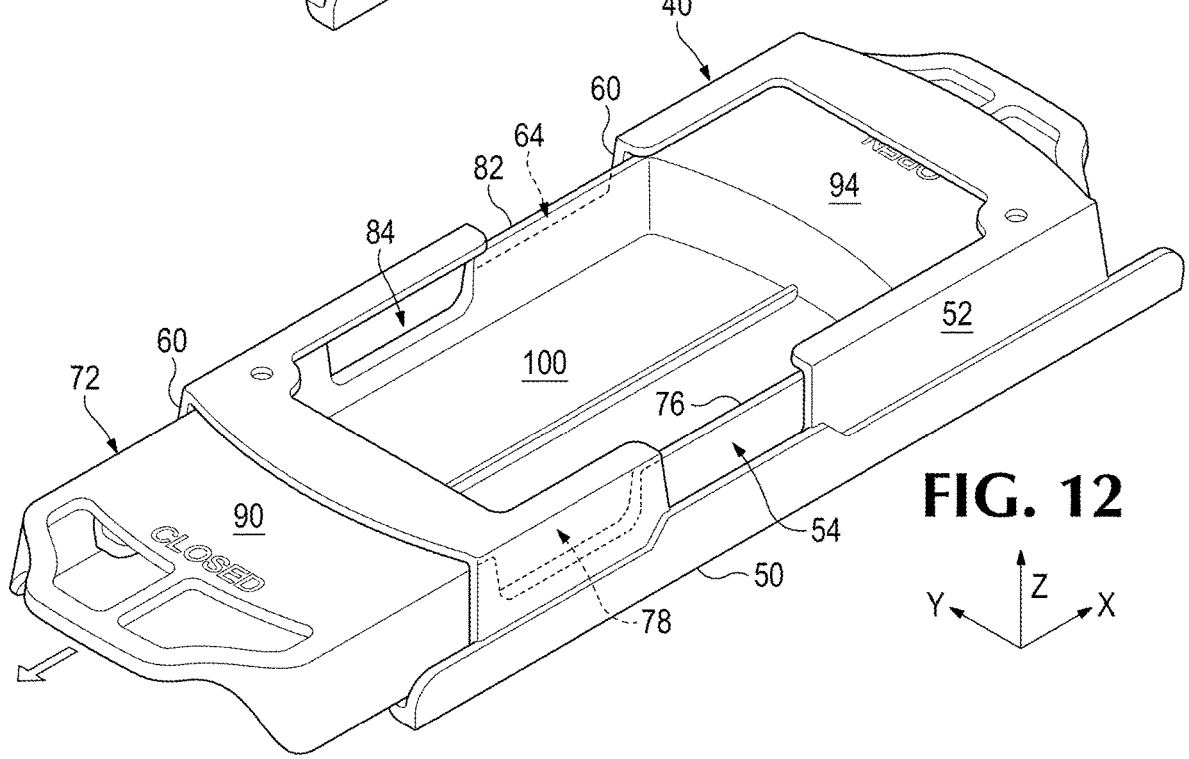
FIG. 12 shows the venting drawer in the closed position relative to the base.

In FIGS. 7 and 12 the venting drawer 72 has been moved in the negative x-axis direction relative to the base 40 to a closed position relative to the base 40 in which the first base venting aperture 54 is blocked by the first drawer side wall 76 and the second base venting aperture 64 is blocked by the second drawer side wall 82. In this position, airflow is substantially blocked from flowing through the first base venting aperture 54 and the second base venting aperture 64, thereby decreasing heating of the charcoal briquettes 25 in the fuel bowl.

Advantageously, the present configuration allows the user to easily and precisely control airflow into the fuel bowl 24, and thereby adjust heat generated by the fuel source in the fuel bowl, by simply sliding the venting drawer 72 relative to the base 40. As shown in FIGS. 11 and 12, in some examples the venting drawer 72 includes lettering on a first drawer extension surface 90 indicating to a user that the venting drawer is in or moving towards a closed position, and lettering on a second drawer extension surface 94 indicating that the venting drawer is in or moving towards an open position.

Additionally, and with reference again to FIG. 8, in this example the first drawer extension surface 90 also defines first handling apertures 92 and the second drawer extension surface 94 also defines second handling apertures 96. Like the handle openings 36 in the handles 34 of the fuel bowl 24, each of the first handling apertures 92 and second handling apertures 96 are configured to receive, for example, hooks from a separate carry handle that enables the venting drawer 72 to be easily and safely moved and adjusted.

With continued reference to FIG. 8 and FIGS. 5-7, and in another potential advantage of the present disclosure, the venting drawer 72 further comprises a drawer floor 100, a first drawer end wall 86, and an opposing second drawer end wall 88 that cooperate with the first drawer side wall 76 and the second drawer side wall 82 to define a container configured to hold ash 102 (see FIG. 3) that falls through the ash grate 32. In this manner, the venting drawer 72 provides the additional functionality of operating as an ash collector that collects and contains the ash produced by the burning charcoal. Advantageously, a user can easily and conveniently dispose of the ash by simply sliding the venting drawer out from the base and depositing the ash in a suitable receptacle.

Additionally, and in another potential advantage of the present disclosure, the five-sided container of the venting drawer 72 that is formed by the drawer floor 100, first drawer end wall 86, opposing second drawer end wall 88, first drawer side wall 76, and second drawer side wall 82 cooperates with features of the base 40 to substantially limit airflow into the fuel bowl 24 from locations other than the first drawer venting aperture 78 and corresponding first base venting aperture 54, and the second drawer venting aperture 84 and corresponding second base venting aperture 64. In this manner, the configuration of the present disclosure enables greater and more precise user control of airflow into the fuel bowl 24, and corresponding precise control over the heat generated by the fuel source in the fuel bowl.

With reference now to FIG. 13, a flow diagram is illustrated depicting an example method 200 for adjusting airflow through a fuel bowl of a grill. The following description of method 200 is provided with reference to the components described herein and shown in FIGS. 1-12. It will be appreciated that the following description of method 200 is provided by way of example and is not meant to be limiting. Therefore, it is to be understood that method 200 may include additional and/or alternative steps relative to those illustrated in FIG. 13. Further, it is to be understood that the steps of method 200 may be performed in any suitable order. Further still, it is to be understood that one or more steps may be omitted from method 200 without departing from the scope of this disclosure. It will also be appreciated that method 200 also may be performed in other contexts using other suitable components.

In some examples, the method 200 is performed utilizing a grill comprising a venting drawer slidably received within a base that supports the fuel bowl as described herein, with the venting drawer comprising a first drawer side wall that defines a first drawer venting aperture and a second drawer side wall opposite to the first drawer side wall that defines a second drawer venting aperture. At 204, the method 200 includes sliding the venting drawer within the base to an open position in which the first drawer venting aperture aligns with a first base venting aperture of the base and the second drawer venting aperture of the venting drawer aligns with a second base venting aperture of the base.

At 208, the method 200 includes sliding the venting drawer within the base to a partial draft position in which the first base venting aperture is partially blocked by the first drawer side wall and the second base venting aperture is partially blocked by the second drawer side wall. At 212, the method 200 includes sliding the venting drawer within the base to a closed position in which the first base venting aperture is blocked by the first drawer side wall and the second base venting aperture is blocked by the second drawer side wall.

The following paragraphs provide additional support for the claims of the subject application. One aspect provides a grill comprising: a cooking grate; a fuel bowl configured to removably support the cooking grate, the fuel bowl comprising an ash grate at a bottom surface; a base supporting the bottom surface of the fuel bowl, the base comprising: a first base side wall that defines a first base venting aperture; and a second base side wall opposite to the first base side wall and defining a second base venting aperture; and a venting drawer slidably received within the base, the venting drawer comprising: a first drawer side wall that defines a first drawer venting aperture; and a second drawer side wall opposite to the first drawer side wall and defining a second drawer venting aperture. The grill may additionally or alternatively include, wherein the venting drawer is configured to slide relative to the base in a longitudinal direction parallel to a longitudinal axis of the base. The grill may additionally or alternatively include, wherein the first base venting aperture is offset from the second base venting aperture along the longitudinal axis of the base. The grill may additionally or alternatively include, wherein the first drawer venting aperture is offset from the second drawer venting aperture along a longitudinal of the venting drawer. The grill may additionally or alternatively include, wherein the first drawer venting aperture aligns with the first base venting aperture and the second drawer venting aperture aligns with the second base venting aperture when the venting drawer is moved to an open position relative to the base.

The grill may additionally or alternatively include, wherein the first base venting aperture is blocked by the first drawer side wall and the second base venting aperture is blocked by the second drawer side wall when the venting drawer is moved to a closed position relative to the base. The grill may additionally or alternatively include, wherein the first base venting aperture is partially blocked by the first drawer side wall and the second base venting aperture is partially blocked by the second drawer side wall when the venting drawer is moved to a partial draft position relative to the base that is between a closed position relative to the base and an open position relative to the base. The grill may additionally or alternatively include, wherein the venting drawer comprises a drawer floor, a first drawer end wall, and an opposing second drawer end wall that cooperate with the first drawer side wall and the second drawer side wall to define a container configured to hold ash that falls through the ash grate.

The grill may additionally or alternatively include, wherein the base comprises a plurality of drawer support tabs configured to support the venting drawer for sliding movement relative to the base. The grill may additionally or alternatively include, wherein four drawer support tabs of the plurality of drawer support tabs support the venting drawer when the venting drawer is in a closed position or in an open position relative to the base. The grill may additionally or alternatively include, wherein the plurality of drawer support tabs are six drawer support tabs, and the six drawer support tabs support the venting drawer when the venting drawer is in a partial draft position relative to the base that is between a closed position relative to the base and an open position relative to the base.

Another aspect provides grill comprising: a cooking grate; a fuel bowl configured to removably support the cooking grate, the fuel bowl comprising an ash grate at a bottom surface; a base supporting the bottom surface of the fuel bowl, the base comprising: a first base side wall that defines a first base venting aperture; and a second base side wall opposite to the first base side wall and defining a second base venting aperture; and a venting drawer slidably received within the base, the venting drawer comprising: a first drawer side wall that defines a first drawer venting aperture; and a second drawer side wall opposite to the first drawer side wall and defining a second drawer venting aperture; wherein the first drawer venting aperture is aligned with the first base venting aperture and the second drawer venting aperture is aligned with the second base venting aperture when the venting drawer is moved to an open position relative to the base; and the first base venting aperture is partially blocked by the first drawer side wall and the second base venting aperture is partially blocked by the second drawer side wall when the venting drawer is moved to a partial draft position relative to the base that is between the open position and a closed position relative to the base.

Another aspect provides a method for adjusting airflow through a fuel bowl of a grill, the grill comprising a venting drawer slidably received within a base that supports the fuel bowl, the venting drawer comprising a first drawer side wall that defines a first drawer venting aperture and a second drawer side wall opposite to the first drawer side wall that defines a second drawer venting aperture, the method comprising: sliding the venting drawer within the base to an open position in which the first drawer venting aperture aligns with a first base venting aperture of the base and the second drawer venting aperture of the venting drawer aligns with a second base venting aperture of the base; and sliding the venting drawer within the base to a partial draft position in which the first base venting aperture is partially blocked by the first drawer side wall and the second base venting aperture is partially blocked by the second drawer side wall. The method may additionally or alternative include, sliding the venting drawer within the base to a closed position in which the first base venting aperture is blocked by the first drawer side wall and the second base venting aperture is blocked by the second drawer side wall.

It will be appreciated that references to "one example" or "an example" are not intended to be interpreted as excluding the existence of additional embodiments that also incorporate the recited features. Unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It will be understood that the configurations and/or approaches described herein are exemplary in nature, and that these specific embodiments or examples are not to be considered in a limiting sense, because numerous variations are possible. The specific routines or methods described herein may represent one or more of any number of manufacturing and/or usage strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A grill comprising:
   a cooking grate;
   a fuel bowl configured to removably support the cooking grate, the fuel bowl comprising an ash grate at a bottom surface;
   a base supporting the bottom surface of the fuel bowl, the base comprising:
      a first base side wall that defines a first base venting aperture; and
      a second base side wall opposite to the first base side wall and defining a second base venting aperture; and
   a venting drawer slidably received within the base, the venting drawer comprising:
      a first drawer side wall that defines a first drawer venting aperture;
      a second drawer side wall opposite to the first drawer side wall and defining a second drawer venting aperture; and
      at least one drawer extension surface coupling the first drawer side wall and the second drawer side wall, such that the drawer can be operated single-handedly to adjust an opening of the first drawer venting aperture and the second drawer venting aperture.

2. The grill of claim 1, wherein the venting drawer is configured to slide relative to the base in a longitudinal direction parallel to a longitudinal axis of the base.

3. The grill of claim 2, wherein the first base venting aperture is offset from the second base venting aperture along the longitudinal axis of the base.

4. The grill of claim 2, wherein the first drawer venting aperture is offset from the second drawer venting aperture along a longitudinal axis of the venting drawer.

5. The grill of claim 1, wherein the first drawer venting aperture aligns with the first base venting aperture and the second drawer venting aperture aligns with the second base venting aperture when the venting drawer is moved to an open position relative to the base.

6. The grill of claim 1, wherein the first base venting aperture is blocked by the first drawer side wall and the second base venting aperture is blocked by the second drawer side wall when the venting drawer is moved to a closed position relative to the base.

7. The grill of claim 1, wherein the first base venting aperture is partially blocked by the first drawer side wall and the second base venting aperture is partially blocked by the second drawer side wall when the venting drawer is moved to a partial draft position relative to the base that is between a closed position relative to the base and an open position relative to the base.

8. The grill of claim 1, wherein the venting drawer comprises a drawer floor, a first drawer end wall, and an opposing second drawer end wall that cooperate with the first drawer side wall and the second drawer side wall to define a container configured to hold ash that falls through the ash grate.

9. The grill of claim 1, wherein the base comprises a plurality of drawer support tabs configured to support the venting drawer for sliding movement relative to the base.

10. The grill of claim 9, wherein four drawer support tabs of the plurality of drawer support tabs support the venting drawer when the venting drawer is in a closed position or in an open position relative to the base.

11. The grill of claim 9, wherein the plurality of drawer support tabs are six drawer support tabs, and the six drawer support tabs support the venting drawer when the venting drawer is in a partial draft position relative to the base that is between a closed position relative to the base and an open position relative to the base.

12. A grill comprising:
   a cooking grate;
   a fuel bowl configured to removably support the cooking grate, the fuel bowl comprising an ash grate at a bottom surface;
   a base supporting the bottom surface of the fuel bowl, the base comprising:
      a first base side wall that defines a first base venting aperture; and
      a second base side wall opposite to the first base side wall and defining a second base venting aperture; and
   a venting drawer slidably received within the base, the venting drawer comprising:
      a first drawer side wall that defines a first drawer venting aperture;
      a second drawer side wall opposite to the first drawer side wall and defining a second drawer venting aperture; and
      at least one drawer extension surface coupling the first drawer side wall and the second drawer side wall, such that the drawer can be operated single-handedly to adjust an opening of the first drawer venting aperture and the second drawer venting aperture,
   wherein the first drawer venting aperture is aligned with the first base venting aperture and the second drawer venting aperture is aligned with the second base venting aperture when the venting drawer is moved to an open position relative to the base; and
   the first base venting aperture is partially blocked by the first drawer side wall and the second base venting aperture is partially blocked by the second drawer side wall when the venting drawer is moved to a partial draft position relative to the base that is between the open position and a closed position relative to the base.

13. A method for adjusting airflow through a fuel bowl of a grill, the grill comprising a venting drawer slidably received within a base that supports the fuel bowl, the venting drawer comprising a first drawer side wall that defines a first drawer venting aperture, a second drawer side wall opposite to the first drawer side wall that defines a second drawer venting aperture, and at least one drawer extension surface coupling the first drawer side wall and the second drawer side wall, such that the drawer can be operated single-handedly to adjust an opening of the first drawer venting aperture and the second drawer venting aperture, the method comprising:
   sliding the venting drawer within the base to an open position in which the first drawer venting aperture aligns with a first base venting aperture of the base and the second drawer venting aperture of the venting drawer aligns with a second base venting aperture of the base; and sliding the venting drawer within the base to a partial draft position in which the first base venting aperture is partially blocked by the first drawer side wall and the second base venting aperture is partially blocked by the second drawer side wall.

14. The method of claim 13, further comprising sliding the venting drawer within the base to a closed position in which the first base venting aperture is blocked by the first drawer side wall and the second base venting aperture is blocked by the second drawer side wall.

15. The grill of claim 1, wherein the at least one drawer extension surface defines at least one handling aperture configured to receive at least one hook from a carry handle that enables sliding the venting drawer within the base.

16. The grill of claim 12, wherein the at least one drawer extension surface defines at least one handling aperture configured to receive at least one hook from a carry handle that enables sliding the venting drawer within the base.

17. The method of claim 13, wherein the at least one drawer extension surface defines at least one handling aperture configured to receive at least one hook from a carry handle that enables sliding the venting drawer within the base.

* * * * *